US010171686B2

(12) United States Patent
Oguma et al.

(10) Patent No.: US 10,171,686 B2
(45) Date of Patent: Jan. 1, 2019

(54) INFORMATION-PROCESSING SYSTEM THAT ACCURATELY ESTIMATES CHARGING AMOUNT BEFORE EXECUTION OF PRINT JOB, AND INFORMATION PROCESSING METHOD

(71) Applicant: Kyocera Document Solutions Inc., Osaka (JP)

(72) Inventors: Takashi Oguma, Osaka (JP); Masafumi Sato, Osaka (JP); Zhenyu Sun, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/821,916

(22) Filed: Nov. 24, 2017

(65) Prior Publication Data
US 2018/0146102 A1 May 24, 2018

(30) Foreign Application Priority Data
Nov. 24, 2016 (JP) .................................. 2016-227783

(51) Int. Cl.
*H04N 1/00* (2006.01)
*G06F 3/12* (2006.01)
*H04N 1/34* (2006.01)
*H04N 1/44* (2006.01)

(52) U.S. Cl.
CPC ......... *H04N 1/0023* (2013.01); *G06F 3/1236* (2013.01); *G06F 3/1276* (2013.01); *G06F 3/1297* (2013.01); *H04N 1/00244* (2013.01); *H04N 1/00477* (2013.01); *H04N 1/346* (2013.01); *H04N 1/4433* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2009/0128844 A1* | 5/2009 | Kondo | ............... | H04N 1/00244 358/1.15 |
| 2011/0007359 A1* | 1/2011 | Yamakawa | .......... | G03G 15/502 358/1.15 |
| 2014/0009790 A1* | 1/2014 | Furubayashi | ......... | G06F 3/1224 358/1.15 |

FOREIGN PATENT DOCUMENTS

| | | |
|---|---|---|
| JP | 2003-067832 A | 3/2003 |
| JP | 2005-274858 A | 10/2005 |
| JP | 2015-138495 A | 7/2015 |

* cited by examiner

*Primary Examiner* — Ngon Nguyen
(74) *Attorney, Agent, or Firm* — HEA Law PLLC

(57) ABSTRACT

An information-processing system includes a personal computer, a management server, and one or more image forming apparatuses. The management server includes an emulator management unit and one or more emulators, and an estimated amount calculating unit. The estimated amount calculating unit calculates an estimated amount of charging when the print job is executed using the total count of pages, the print paper sheet size for each page, and the color/monochrome type for each page of the document to be printed by the print job determined by the emulator selected by the emulator management unit. Each of the one or more image forming apparatuses includes an estimated amount display. The estimated amount display obtains the estimated amount of charging from the management server when the print job is executed, so as to present the estimated amount of charging to the user via the display.

3 Claims, 6 Drawing Sheets

INFORMATION-PROCESSING SYSTEM THAT ACCURATELY ESTIMATES CHARGING AMOUNT BEFORE EXECUTION OF PRINT JOB, AND INFORMATION PROCESSING METHOD

INCORPORATION BY REFERENCE

This application is based upon, and claims the benefit of priority from, corresponding Japanese Patent Application No. 2016-227783 filed in the Japan Patent Office on Nov. 24, 2016, the entire contents of which are incorporated herein by reference.

BACKGROUND

Unless otherwise indicated herein, the description in this section is not prior art to the claims in this application and is not admitted to be prior art by inclusion in this section.

It has been used a typical pull print system in which an image forming apparatus, a host computer that generates a print job, and a management server that manages the print job are connected through a network.

In the typical pull print system, printing can be performed in the following way. The print job is preliminarily registered in the management server from the host computer, and the print job registered in the management server is selected and downloaded with an operation panel of the image forming apparatus.

In the typical pull print system, there have been variously contrived to make a system efficient and enhance a convenience of a user.

For example, when a print setting (such as a paper sheet size setting, a color/monochrome setting) is changed in the image forming apparatus, there is proposed a technique that prevents an increase of a network traffic and avoids a condition where a resource of an image forming apparatus side is excessively used by transmitting the changed content of the print setting to the management server and rewriting the content of the print job in the management server. However, it cannot be enough that various kinds of improvement are being done for calculation of an estimated amount of charge. For example, in the case of a print job in which only a first page is printed in color and all the other pages are printed in monochrome, at an estimation, since the first page is color designation, the estimated amount has been calculated on the assumption that color printing is performed across all pages.

SUMMARY

An information-processing system according to one aspect of the disclosure includes a personal computer, a management server, and one or more image forming apparatuses. The personal computer is network-connected and generates a print job. The management server spools the print job generated in the personal computer. The one or more image forming apparatuses download and execute the print job spooled by the management server in response to an instruction of a user. The personal computer includes a first communication unit and a printer driver. The first communication unit communicates with the management server. The printer driver generates the print job based on an instruction of an application program. The printer driver spools the print job to the management server. The management server includes a second communication unit, a first storage unit, a print job spooling unit, a login authentication unit, one or more emulators, an emulator management unit, and an estimated amount calculating unit. The second communication unit communicates with the personal computer and the one or more image forming apparatuses. The first storage unit spools the print job. The print job spooling unit accepts the print job from the personal computer. The print job spooling unit spools the accepted print job to the first storage unit. The print job spooling unit transmits the spooled print job to the image forming apparatus to which the user has logged in. The login authentication unit performs a login authentication process of the user who has logged in from any of the image forming apparatuses in cooperation with the image forming apparatus to which the user has logged in. The one or more emulators accept the print job planned to be executed with the image forming apparatus to which the user has logged in. The one or more emulators determine a total count of pages, a print paper sheet size for each page, and a color/monochrome type for each page of a document to be printed by the accepted print job. The emulator management unit selects an emulator used when an estimated amount is calculated when the print job is executed based on a model name of the image forming apparatus to which the user has logged in. The estimated amount calculating unit calculates an estimated amount of charging when the print job is executed using the total count of pages, the print paper sheet size for each page, and the color/monochrome type for each page of the document to be printed by the print job determined by the emulator selected by the emulator management unit. Each of the one or more image forming apparatuses includes a third communication unit, an operation unit, a display, a login process unit, an estimated amount display, and a pull print execution unit. The third communication unit communicates with the management server. The login process unit performs a login process of the user who logs in via the operation unit in cooperation with the management server. The estimated amount display obtains the estimated amount of charging from the management server when the print job is executed, so as to present the estimated amount of charging to the user via the display. The pull print execution unit downloads the print job from the management server to its own image forming apparatus to execute the print job.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
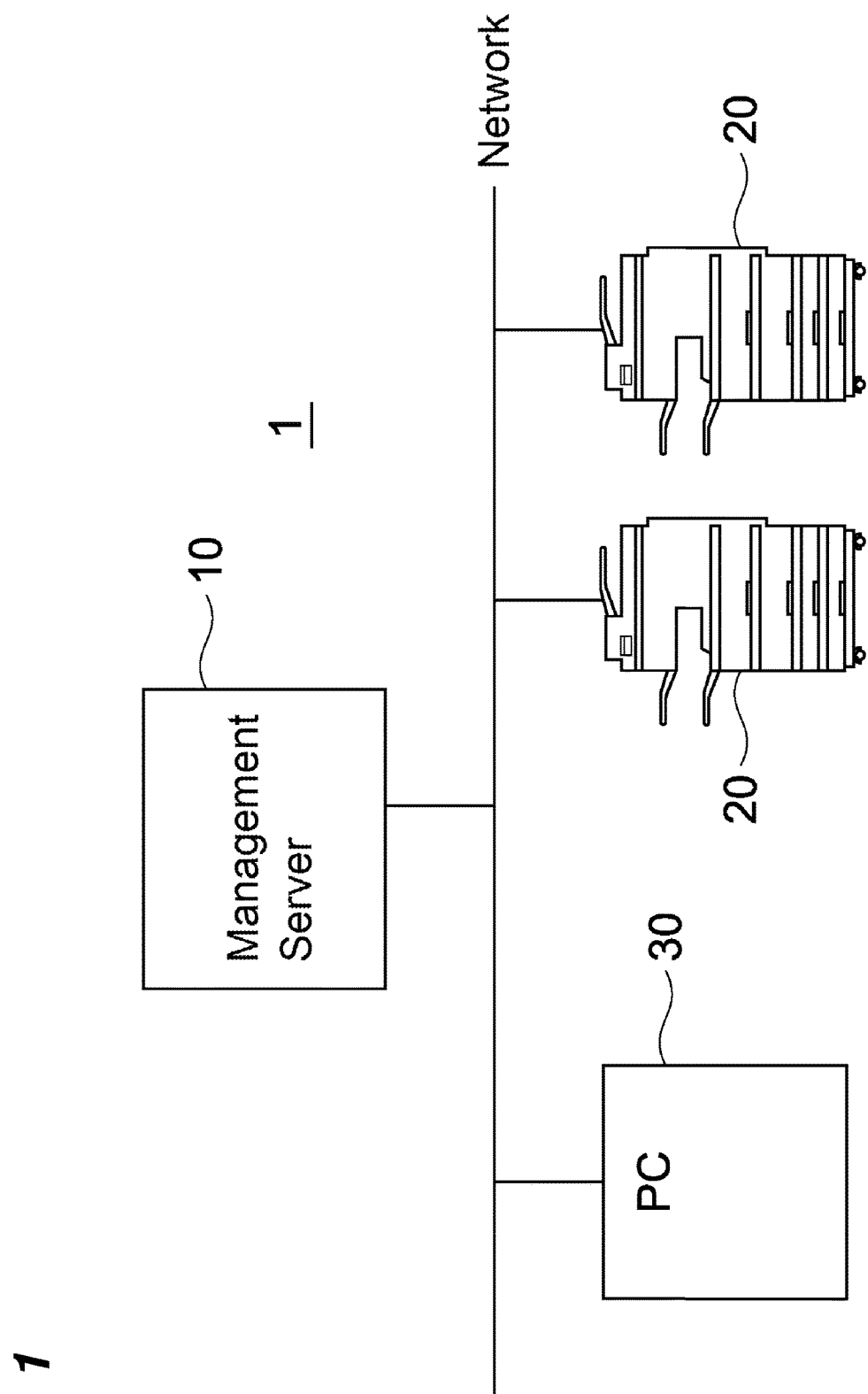
FIG. 1 illustrates a schematic configuration of an information-processing system according to one embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, an overall configuration of an information-processing system 1 according to one embodiment of the disclosure will be described. FIG. 1 illustrates the schematic configuration of the information-processing system 1 according to the one embodiment of the present disclosure.

The information-processing system 1 includes a management server 10, one or more image forming apparatuses 20, and a personal computer (PC) 30 that are network-connected.

The PC 30 is a computer that generates a print job. The generated print job is registered (spooled) to the management server 10 through the network.

The management server 10 processes a login authentication from the image forming apparatus 20 to which a user has logged in. The management server 10 causes the image forming apparatus 20 to which the user has logged in to download and print the spooled print job.

The image forming apparatus 20 accepts the login of the user from an operation panel of its own image forming apparatus and presents a list of the print jobs spooled in the management server 10 to the user. The image forming apparatus 20 downloads the print job selected by the user from the management server 10 and prints the print job.

The user, for example, gives an instruction to print a document on the PC 30 to generate a print job and transfer the print job to the management server 10. The user travels to where a certain image forming apparatus 20 is to log in. The user selects one to be printed with the image forming apparatus 20 among the print jobs spooled in the management server 10. The user picks up the document printed with the image forming apparatus 20.

Therefore, the document printed by the user is neither seen by another person nor taken away by another person while the user is travelling to where the image forming apparatus 20 is after printing is performed with the PC 30.

The advantage of the pull print has been described above.

When a charging management for each user is additionally performed when the pull print is performed, each user is provided with an amount of money (hereinafter referred to as a budget) that can be used for printing. Each time each user executes a print job to print a document, an actual charging amount of money is deducted from the budget. When the budget hits zero, the user can no longer execute a print job.

Therefore, for each user, it is important to know a remaining amount of the budget and an accurate amount of money to be charged for each of the print jobs when each user logs in to the image forming apparatus 20 to see a list of the spooled print jobs from the management server 10 and select a job to be printed.

The overall configuration of the information-processing system 1 according to the one embodiment of the disclosure has been described above.

Figure 2:
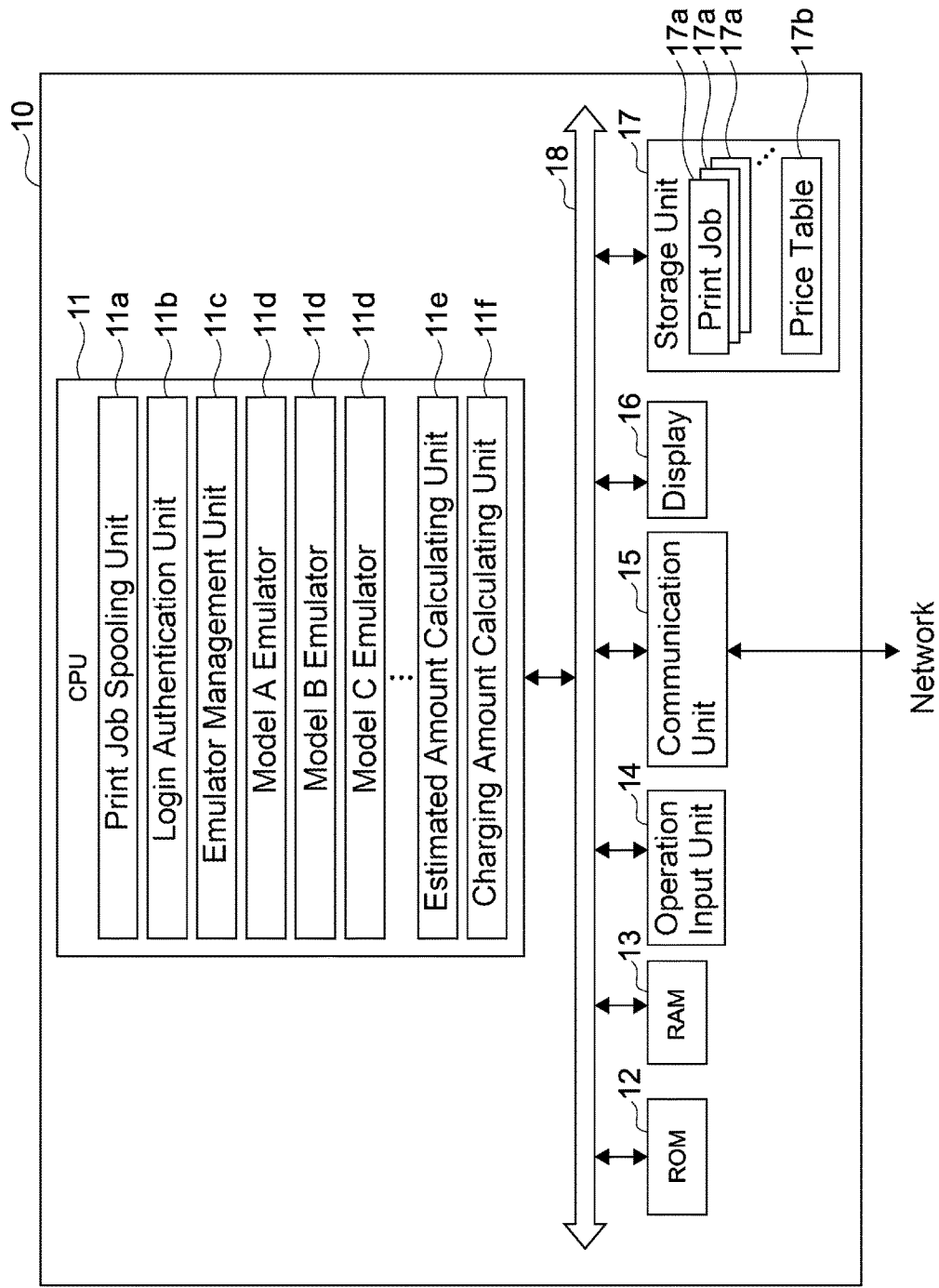
FIG. 2 illustrates a block configuration of a management server.

Next, a description will be given of a configuration of the management server 10. The management server 10 may be constituted of dedicated hardware and software or may be constituted of a general computer. FIG. 2 illustrates a block configuration of the management server 10.

As illustrated in FIG. 2, the management server 10 includes a central processing unit (CPU) 11, a read only memory (ROM) 12, a random-access memory (RAM) 13, an operation input unit 14, a communication unit 15 (a second communication unit), a display 16, and a storage unit 17 (a first storage unit). These respective blocks are connected via a bus 18.

The ROM 12 stores a plurality of programs, such as firmware, and data for executing various processes. The RAM 13 is used as a working area for the CPU 11 and temporarily holds an operating system (OS), various applications during execution, and various pieces of data during processing.

The storage unit 17 is, for example, a hard disk drive (HDD), a flash memory, or other non-volatile memories. The storage unit 17 stores the OS, the various applications, various pieces of data, print jobs 17a, and a price table 17b. The print job 17a is accepted by the management server 10 from the PC 30 and spooled. In execution, the print job 17a is transmitted to the image forming apparatus 20 to which the user has logged in. The price table 17b is a table to calculate the charging amount of money when the print job is executed. The details will be described below.

The communication unit 15 is connected to a network for exchanging information with the image forming apparatus 20 and the PC 30.

The CPU 11 loads a program corresponding to an instruction given from the operation input unit 14 among the plurality of programs stored in the ROM 12 and the storage unit 17 in the RAM 13. The CPU 11 appropriately controls the display 16 and the storage unit 17 according to this loaded program.

The operation input unit 14 is, for example, a pointing device, such as a computer mouse, a keyboard, a touch panel, and other operating devices.

The display 16 is, for example, a liquid crystal display, an electro-luminescence (EL) display, a plasma display, or similar display.

Next, a description will be given of function blocks achieved by execution of the program by the CPU 11.

The function blocks achieved by the CPU 11 in the management server 10 includes a print job spooling unit 11a, a login authentication unit 11b, an emulator management unit 11c, emulators 11d for respective models of the image forming apparatuses, an estimated amount calculating unit 11e, and a charging amount calculating unit 11f.

The print job spooling unit 11a accepts a print job from the PC 30 and spools to the storage unit 17. The print job spooling unit 11a also transmits the spooled print job to the image forming apparatus 20 to which the user has logged in.

The login authentication unit 11b performs a login authentication process of the user who has logged in from the image forming apparatus 20 in cooperation with the image forming apparatus 20 to which the user has logged in.

The emulator management unit 11c selects an emulator used when an estimated amount is calculated based on a model name of the image forming apparatus 20 to which the user has logged in.

The emulators 11d for the respective models of the image forming apparatuses are emulators of the image forming apparatuses 20 prepared for each of the models of the image forming apparatuses used when the estimated amount is calculated.

When capability information (including currently printable paper sheet size and availability of color/monochrome printing) of the image forming apparatus 20 to which the user has logged in and the print job planned to be executed are input to the emulator 11*d* selected by the emulator management unit 11*c*, a total count of pages, a print paper sheet size for each page, and a color/monochrome type for each page of a document to be printed by the print job are determined.

The estimated amount calculating unit 11*e* calculates the estimated amount of when the print job is executed from the total count of pages, the print paper sheet size for each page, and the color/monochrome type for each page of the document to be printed by the print job determined by the emulator 11*d*, and the price table 17*b*.

The charging amount calculating unit 11*f* calculates an actual charging amount from a total count of pages, a print paper sheet size for each page, and a color/monochrome type for each page of the document as a result of the print job actually executed and counted with the image forming apparatus 20 to which the user has logged in, and the price table 17*b*.

The configuration of the management server 10 has been described above.

Figure 3:
FIG. 3 illustrates an example of a price table.

Next, a description will be given of the price table 17*b*. FIG. 3 illustrates an example of the price table 17*b*. In the price table 17*b*, charging amounts of money per one page are determined for combinations of paper sheet sizes and color/monochrome types. For example, when the paper sheet size used for printing is A4 size and color printing is performed, the charging amount per one page is 50 yen. This price table 17*b* is used for calculating the estimated charging amount before the print job is executed and calculating the actual charging amount of money after the print job is executed. The price table 17*b* has been described above.

Figure 4:
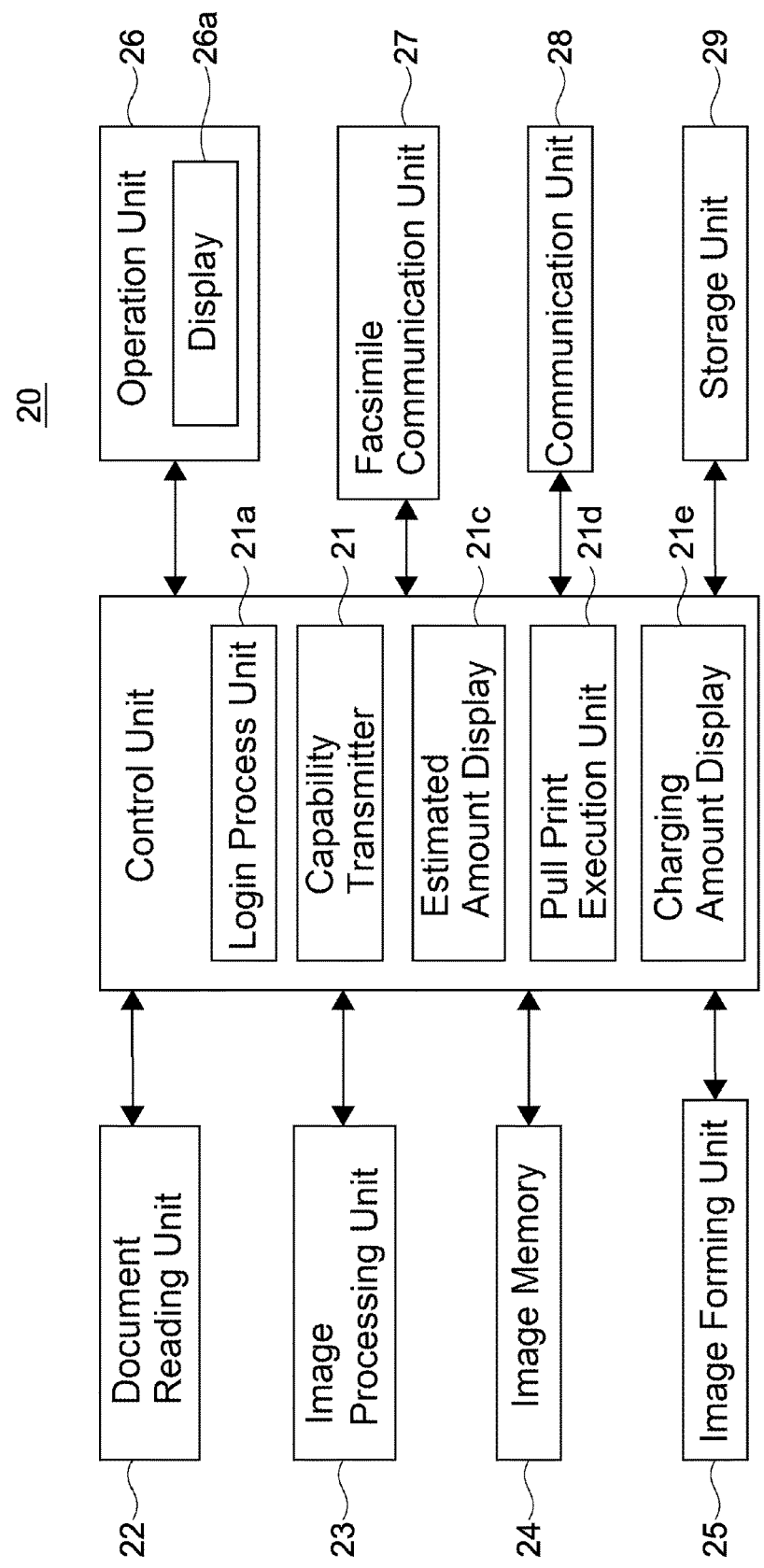
FIG. 4 illustrates a block configuration of an image forming apparatus.

Next, a description will be given of a configuration of the image forming apparatus 20. FIG. 4 illustrates a block configuration of the image forming apparatus 20.

The image forming apparatus 20 includes a control unit 21. The control unit 21, which is constituted of a CPU, a RAM, a ROM, a dedicated hardware circuit, and a similar device, manages overall operation control of the image forming apparatus 20.

The control unit 21 is connected to a document reading unit 22, an image processing unit 23, an image memory 24, an image forming unit 25, an operation unit 26, a display 26*a*, a facsimile communication unit 27, a communication unit 28 (a third communication unit), a storage unit 29, and a similar unit. The control unit 21 performs the operation control on the connected respective units described above and transmits and receives signals or data to/from the respective units.

The control unit 21 controls a driving and processing of a mechanism required to execute an operation control on each function, such as a scanner function, a printing function, a copy function, and a facsimile transmission/reception function in accordance with an execution instruction of a job input by the user through the operation unit 26, a network-connected PC, or similar unit.

The control unit 21 includes a login process unit 21*a*, a capability transmitter 21*b*, an estimated amount display 21*c*, a pull print execution unit 21*d*, and a charging amount display 21*e*. The login process unit 21*a*, the capability transmitter 21*b*, the estimated amount display 21*c*, the pull print execution unit 21*d*, and the charging amount display 21*e* are function blocks achieved by executing a program loaded from the ROM or similar memory to the RAM by the CPU.

The login process unit 21*a* performs the login process of the user who logs in via the operation unit 26 in cooperation with the management server 10. The user can see a list of the print jobs, which are generated by the user himself/herself and spooled in the management server 10, by logging in to the image forming apparatus 20 at hand.

The capability transmitter 21*b* transmits the capability information of its own image forming apparatus 20 to the management server 10. The capability information here is information, for example, which paper sheet size is currently handleable by its own image forming apparatus and whether color printing is available or only monochrome printing is possible.

The estimated amount display 21*c* obtains the estimated amount of charging of when the print job selected by the user from the list of the spooled print jobs in the management server 10 is executed from the management server 10, and presents to the user via the display 26*a*.

The pull print execution unit 21*d* download the print job selected by the user from the list of the spooled print jobs in the management server 10 to its own image forming apparatus and executes the print job.

The charging amount display 21*e* obtains the actual charging amount of the print job selected by the user from the list of the spooled print jobs in the management server 10 and executed from the management server 10, and presents the actual charging amount to the user via the display 26*a*.

The document reading unit 22 reads an image from a document.

The image processing unit 23 performs image processing on image data of the image read by the document reading unit 22 as necessary. For example, the image processing unit 23 performs the image processing, such as a shading correction in order to improve a quality after image formation of the image read by the document reading unit 22.

The image memory 24 is a region that temporarily stores data of the document image acquired by the document reading unit 22 reading and temporarily stores data of print target at the image forming unit 25.

The image forming unit 25 forms an image of the image data or similar data read by the document reading unit 22.

The operation unit 26 includes a touch panel unit and an operation key portion that accept instructions on various operations and processing executable by the image forming apparatus 20 from the user. The touch panel unit includes the display 26*a*, such as a liquid crystal display (LCD), with the touch panel.

The facsimile communication unit 27, which includes an encoding/decoding unit, a modulation/demodulation unit, and a network control unit (NCU) (not illustrated), performs transmission of a facsimile using a dial-up line network.

The communication unit 28, which is constituted of a communication module, such as a LAN board, transmits and receives various data to/from equipment (for example, PC), such as the management server 10, via LAN or similar network connected to the communication unit 28.

The storage unit 29 stores the document image or similar data read by the document reading unit 22. The storage unit 29 is a large-capacity storage device, such as a HDD.

The configuration of the image forming apparatus 20 has been described above.

Figure 5:
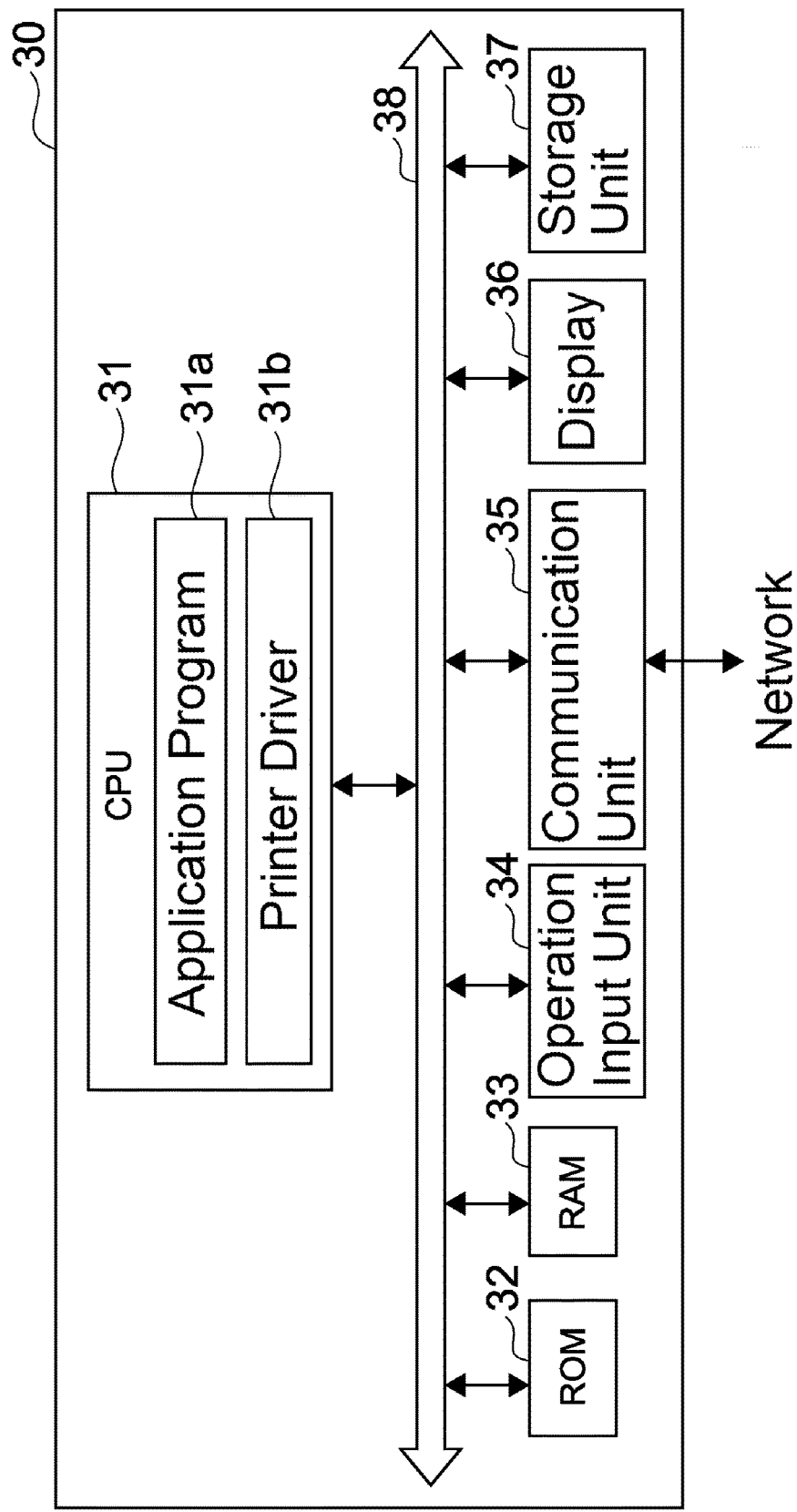
FIG. 5 illustrates a block configuration of a Personal Computer (PC).

Next, a description will be given of a configuration of the PC 30. The PC 30 may be constituted of dedicated hardware and software or may be constituted of a general computer. FIG. 5 illustrates a block configuration of the PC 30.

As illustrated in FIG. 5, the PC 30 includes a CPU 31, a ROM 32, a RAM 33, an operation input unit 34, a communication unit 35 (a first communication unit), a display 36, and a storage unit 37. These respective blocks are connected via a bus 38.

The ROM 32 stores a plurality of programs, such as firmware, and data for executing various processes. The RAM 33 is used as a working area for the CPU 31 and temporarily holds an OS, various applications during execution, and various pieces of data during processing.

The storage unit 37 is, for example, a HDD, a flash memory, or other non-volatile memories. The storage unit 37 stores the OS, the various applications, and various pieces of data.

The communication unit 35 is connected to a network for exchanging information with the management server 10.

The CPU 31 loads a program corresponding to an instruction given from the operation input unit 34 among the plurality of programs stored in the ROM 32 and the storage unit 37 in the RAM 33. The CPU 31 appropriately controls the display 36 and the storage unit 37 according to this loaded program.

The operation input unit 34 is, for example, a pointing device, such as a computer mouse, a keyboard, a touch panel, and other operating devices.

The display 36 is, for example, a liquid crystal display, an EL display, a plasma display, or similar display.

Next, a description will be given of function blocks achieved by execution of the program by the CPU 31.

The function blocks achieved by the CPU 31 in the PC 30 are an application program 31*a* and a printer driver 31*b*.

The application program 31*a* makes a document that serves as a base of a print job, and gives an instruction to generate a print job to the printer driver 31*b*. The application program 31*a* is a program, such as a word processor, spreadsheet program software, and image processing software.

The printer driver 31*b* generates the print job based on the instruction from the application program 31*a*, and spools the generated print job in the management server 10.

The configuration of the PC 30 has been described above.

Figure 6:
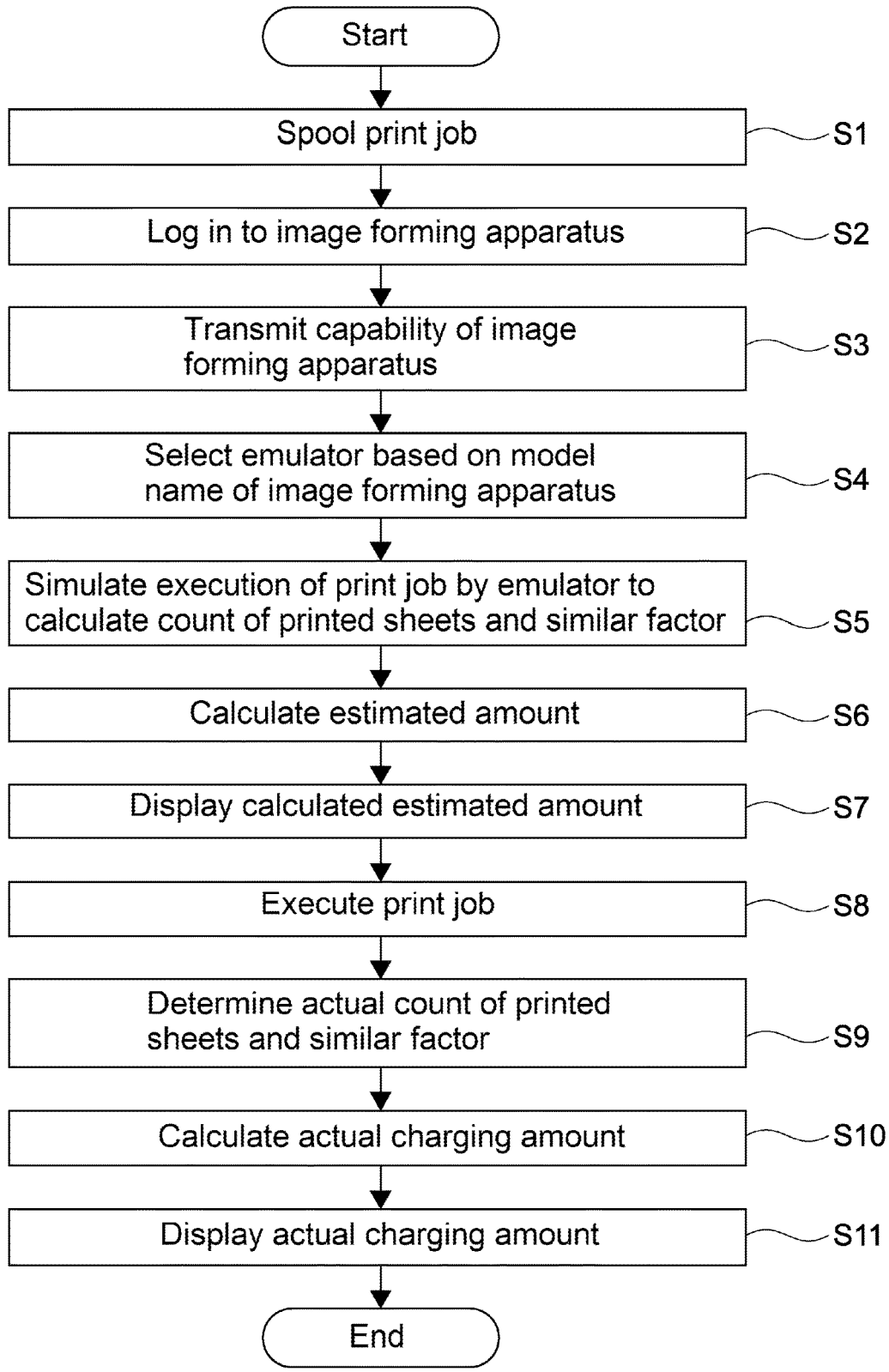
FIG. 6 illustrates a flowchart of the information-processing system.

Next, a description will be given of a process flow in the information-processing system 1. FIG. 6 illustrates the flowchart of the information-processing system 1.

First, the printer driver 31*b* of the PC 30 generates a print job in response to an instruction from the application program 31*a*, and transfers the generated print job to the print job spooling unit 11*a* of the management server 10 to spool (Step S1).

Next, the user operates the operation unit 26 in front of the image forming apparatus 20 with which the print job is desired to be printed, and logs in (Step S2).

The login process is processed in cooperation of the login process unit 21*a* of the image forming apparatus 20 and the login authentication unit 11*b* of the management server 10.

Upon a successful login process, the user is shown a list of print jobs that are spooled in the management server 10 and belongs to this user.

Next, the capability transmitter 21*b* of the image forming apparatus 20 to which the user has logged in transmits capability information regarding its own image forming apparatus to the emulator management unit 11*c* of the management server 10 (Step S3).

A timing at which the image forming apparatus 20 informs a model name of its own image forming apparatus to the management server 10 may be when the login process is performed or may be at a timing when the capability information is transmitted to the management server 10.

Next, the emulator management unit 11*c* of the management server 10 selects the emulator 11*d* that emulates the execution of the print job based on the model name of the image forming apparatus 20 to which the user has logged in (Step S4).

Next, the selected emulator 11*d* accepts the capability information and the actual print job from the emulator management unit 11*c*, and emulates the execution of the print job specified by the user to determine, for example, a total count of printed sheets, a paper sheet size for each page, and a color/monochrome type for each page (Step S5).

The reason why the capability information is used here is to cope with, for example, a situation where only the A4 size is printable when the paper sheet currently prepared in the tray is only the A4 size, even if the model is capable of printing the A4 size and the A3 size.

Next, the estimated amount calculating unit 11*e* of the management server 10 calculates the estimated amount of when the print job is executed from the total count of printed sheets, the paper sheet size for each page, and the color/monochrome type for each page determined by the emulator 11*d*, and the price table 17*b* (Step S6).

Next, the estimated amount display 21*c* of the image forming apparatus 20 to which the user has logged in obtains the calculated estimated amount from the estimated amount calculating unit 11*e* of the management server 10 to present the estimated amount to the user via the display 26*a* (Step S7).

Next, as soon as the user who is satisfied by the estimated amount gives an instruction to execute the selected print job, the pull print execution unit 21*d* downloads the selected print job to its own image forming apparatus 20 and executes the downloaded print job (Step S8).

Next, the pull print execution unit 21*d* counts the actual total count of printed sheets, paper sheet size for each page, and color/monochrome type for each page when the print job is executed, and reports to the management server 10 (Step S9).

Next, the charging amount calculating unit 11*f* of the management server 10 calculates the actual charging amount of money based on the actual total count of printed sheets, paper sheet size for each page, and color/monochrome type for each page of the print job received from the image forming apparatus 20 that executed the print job, and the price table 17*b* (Step S10).

Next, the charging amount display 21*e* of the image forming apparatus 20 with which the print job was executed obtains the calculated actual charging amount of money from the charging amount calculating unit 11*f* of the management server 10 to present the charging amount of money to the user via the display 26*a* (Step S11).

The process flow in the information-processing system 1 has been described above.

As described above, the information-processing system 1 according to the present disclosure includes the personal computer 30, the management server 10, and the one or more image forming apparatuses 20. The personal computer 30 is network-connected and generates a print job. The management server 10 spools the print job generated in the personal computer 30. The one or more image forming apparatuses 20 download and execute the print job spooled by the management server 10 in response to the instruction of the user. The personal computer 30 includes the first communication unit 35 and the printer driver 31b. The first communication unit 35 communicates with the management server 10. The printer driver 31b generates the print job based on the instruction of the application program 31a and spools the print job to the management server 10. The management server 10 includes the second communication unit 15, the first storage unit 17, the print job spooling unit 11a, the login authentication unit 11b, the emulator management unit 11c, the one or more emulators 11d, and the estimated amount calculating unit 11e. The second communication unit 15 communicates with the personal computer 30 and the one or more image forming apparatuses 20. The first storage unit 17 spools the print job. The print job spooling unit 11a accepts the print job from the personal computer 30, spools the accepted print job to the first storage unit 17, and transmits the spooled print job to the image forming apparatus 20 to which the user has logged in. The login authentication unit 11b performs the login authentication process of the user who has logged in from any of the image forming apparatuses 20 in cooperation with the image forming apparatus 20 to which the user has logged in. The emulator management unit 11c selects the emulator 11d used when the estimated amount is calculated when the print job is executed based on the model name of the image forming apparatus 20 to which the user has logged in. The one or more emulators 11d accept the print job planned to be executed with the image forming apparatus 20 to which the user has logged in and determine the total count of pages, the print paper sheet size for each page, and the color/monochrome type for each page of the document to be printed by the accepted print job. The estimated amount calculating unit 11e calculates the estimated amount of charging when the print job is executed using the total count of pages, the print paper sheet size for each page, and the color/monochrome type for each page of the document to be printed by the print job determined by the emulator 11d selected by the emulator management unit 11c. Each of the one or more image forming apparatuses 20 includes the third communication unit 28, the operation unit 26, the display 26a, the login process unit 21a, the estimated amount display 21c, and the pull print execution unit 21d. The third communication unit 28 communicates with the management server 10. The login process unit 21a performs the login process of the user who logs in via the operation unit 26 in cooperation with the management server 10. The estimated amount display 21c obtains the estimated amount of charging from the management server 10 when the print job is executed to present the estimated amount of charging to the user via the display 26a. The pull print execution unit 21d downloads the print job from the management server 10 to its own image forming apparatus 20 to execute the print job.

Therefore, the accurate estimation of the charging amount of money can be performed before the print job is executed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information-processing system comprising:
a network-connected personal computer for generating print jobs;
a management server for spooling the print jobs generated in the personal computer; and
one or more image forming apparatuses for downloading and executing the print jobs spooled by the management server in response to user instruction;
the personal computer including
a first communication unit for exchanging information via a network connection with the management server, and
a printer driver for generating print jobs based on an application-program instruction, wherein the printer driver spools the print jobs to the management server;
the management server including
a second communication unit for exchanging information via a network connection with the personal computer and the one or more image forming apparatuses,
a management-server storage unit for spooling the print jobs,
a print job spooling unit for accepting the print jobs from the personal computer, wherein the print job spooling unit spools the accepted print jobs to the management-server storage unit, and the print job spooling unit transmits the spooled print jobs to a user-logged-in image forming apparatus among the one or more image forming apparatuses,
a login authentication unit for performing a process of login-authenticating a user who has logged in from any of the one or more image forming apparatuses, in cooperation with the user-logged-in image forming apparatus,
a central processing unit (CPU) and memory storing an operational program, the CPU loading the operational program thereby functioning as
one or more emulators for emulating the one or more image forming apparatuses according to model of the one or more image forming apparatuses and accepting a print job scheduled to be executed by the user-logged-in image forming apparatus, the one or more emulators determining total page count, by-page print-paper sheet size, and by-page color/monochrome category of a document to be printed according to the accepted print job,
an emulator management unit for selecting, based on model name of the user-logged-in image forming apparatus, the emulator used in calculating an estimated print-charge amount for when the accepted print job is executed, and
an estimated print-charge amount calculating unit for calculating the estimated print-charge amount for when the accepted print job is executed, using the total page count, the by-page print-paper sheet size, and the by-page color/monochrome category, determined by the emulator selected by the emulator management unit, of the document to be printed according to the accepted print job; and
each of the one or more image forming apparatuses including
a third communication unit for exchanging information via a network connection with the management server,
an operation unit,
a display,
a login process unit, connected to the operation unit, for performing a process, in cooperation with the management server, of logging in a user who carries out a login operation via the operation unit, an estimated print-charge amount display for obtaining from the management server the estimated amount to charge when the accepted print job is executed, and via the display presenting the estimated print-charge amount to the logged-in user, a pull print execution unit for downloading the accepted print job from the management server to the image forming apparatus itself, to execute the accepted print job, and a capability transmitter for transmitting to the management server currently printable paper-sheet size and current availability of color/monochrome printing in the image forming apparatus itself, as capability information; wherein the emulator selected by the emulator management unit receives the capability information from the capability transmitter and receives the accepted print job from the emulator management unit, emulates execution of the accepted print job, and based on the capability information determines total page count, by-page print-paper sheet size, and by-page color/monochrome category of the document to be printed according to the accepted print job.

2. The information-processing system according to claim 1, wherein:

the management-server storage unit stores a price table in which print-charge amounts per single page for each of combinations of paper-sheet size and color/monochrome category are described; and the estimated print-charge amount calculating unit uses the price table to calculate the estimated print-charge amount.

3. An information-processing method in an information-processing system including a network-connected personal computer for generating print jobs, a management server for spooling the print jobs generated in the personal computer, and one or more image forming apparatuses for downloading and executing the print jobs spooled by the management server in response to user instruction, the information-processing method comprising:

via a printer driver in the personal computer, generating a print job based on an application-program instruction, and spooling the print job to the management server;

via a print job spooling unit in the management server, accepting the print job from the personal computer and spooling the accepted print job to the management-server storage unit;

via a login process unit in a user-logged-in image forming apparatus among the one or more image forming apparatuses, performing a process, in cooperation with the management server, of logging in a user who carries out a login operation via an operation unit in the user-logged-in image forming apparatus;

via an emulator management unit in the management server, selecting one or more emulators, configured by a central processing unit and program-storing memory in the management server for emulating the one or more image forming apparatuses according to model of the one or more image forming apparatuses, used in calculating an estimated print-charge amount for when the accepted print job is executed;

via a capability transmitter each of the one or more image forming apparatuses includes, transmitting to the management server currently printable paper-sheet size and current availability of color/monochrome printing in the image forming apparatus itself, as capability information;

via the emulator selected by the emulator management unit in the management server, receiving the capability information from the capability transmitter and receiving the accepted print job from the emulator management unit, emulating execution of the accepted print job, and based on the capability information determining total page count, by-page print-paper sheet size, and by-page color/monochrome category of a document to be printed according to the accepted print job;

via an estimated print-charge amount calculating unit in the management server, calculating the estimated print-charge amount for when the accepted print job is executed, using the total page count, the by-page print-paper sheet size, and the by-page color/monochrome category, determined by the emulator selected by the emulator management unit, of the document to be printed according to the accepted print job; and via an estimated print-charge amount display in the user-logged-in image forming apparatus, obtaining from the management server the estimated amount to charge when the accepted print job is executed, and via the display presenting the estimated print-charge amount to the logged-in user.

* * * * *